Figure 2:
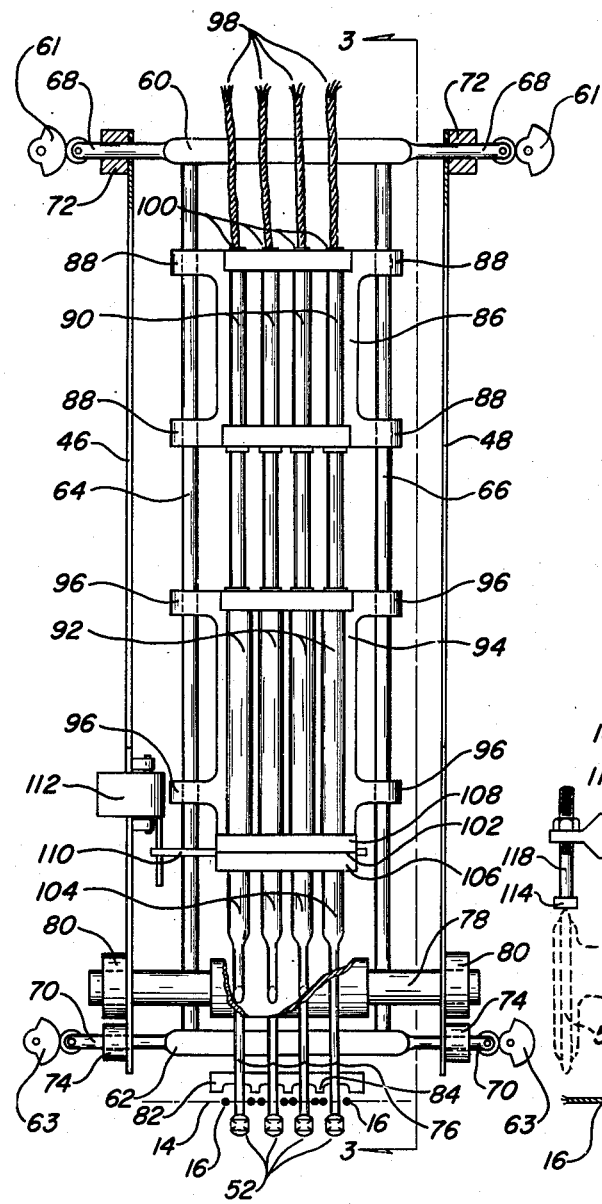

May 19, 1953  P. H. STORTZ  2,638,933
METHOD AND APPARATUS FOR PRODUCING PILED FABRICS
Filed June 17, 1950  6 Sheets-Sheet 1
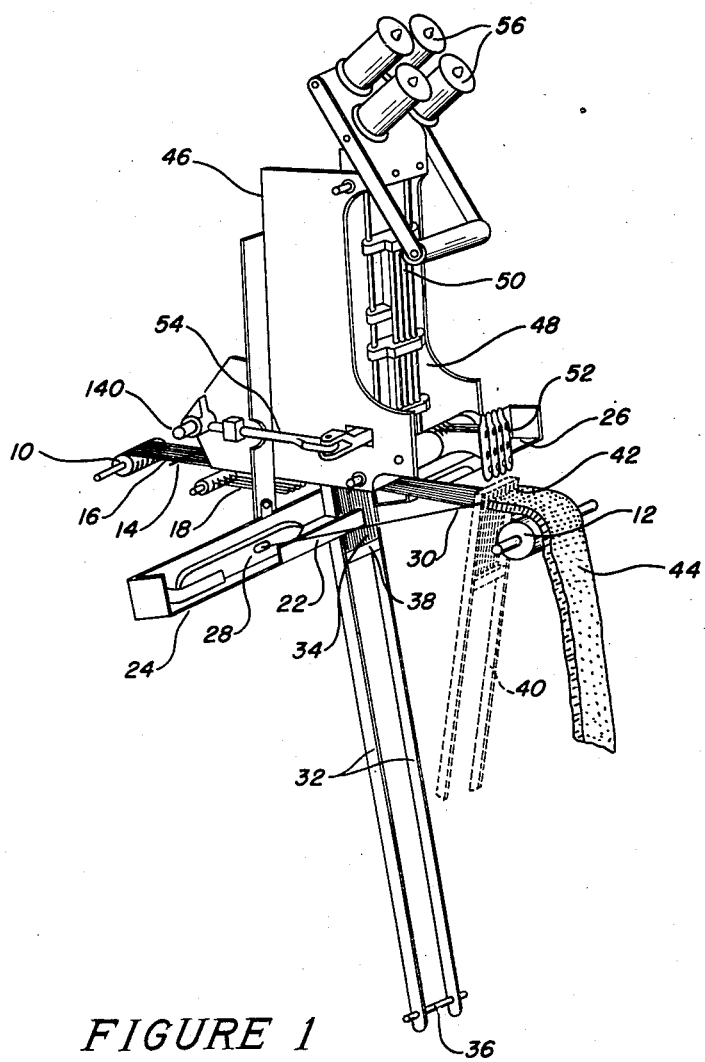
FIGURE 1
INVENTOR.
PARKER H. STORTZ
BY
AGENT.

May 19, 1953 P. H. STORTZ 2,638,933
METHOD AND APPARATUS FOR PRODUCING PILED FABRICS
Filed June 17, 1950 6 Sheets-Sheet 2

INVENTOR.
PARKER H. STORTZ
BY
AGENT.

May 19, 1953 P. H. STORTZ 2,638,933
METHOD AND APPARATUS FOR PRODUCING PILED FABRICS
Filed June 17, 1950 6 Sheets-Sheet 4
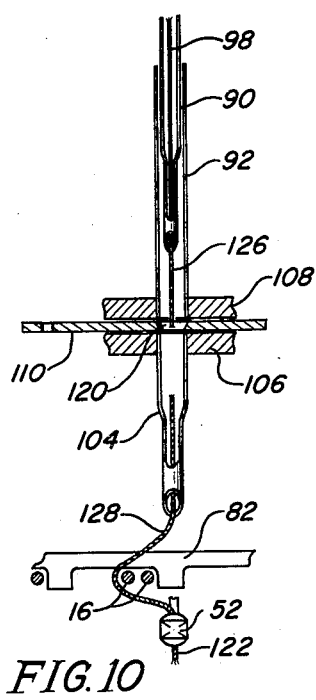
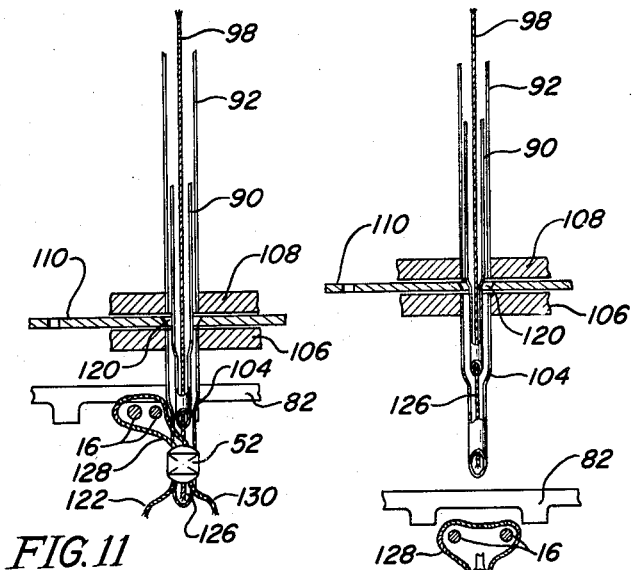
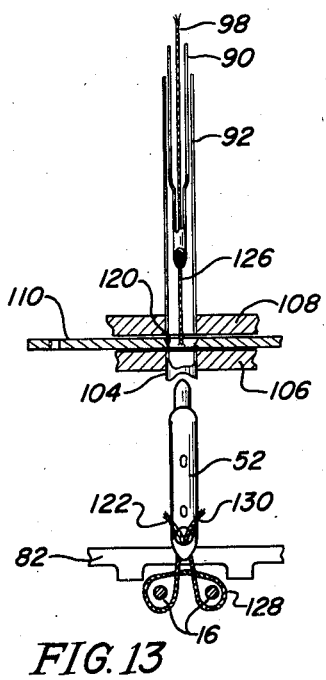
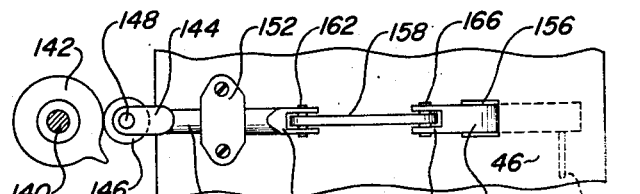
INVENTOR.
PARKER H. STORTZ
BY
AGENT.

May 19, 1953 P. H. STORTZ 2,638,933
METHOD AND APPARATUS FOR PRODUCING PILED FABRICS
Filed June 17, 1950 6 Sheets-Sheet 5
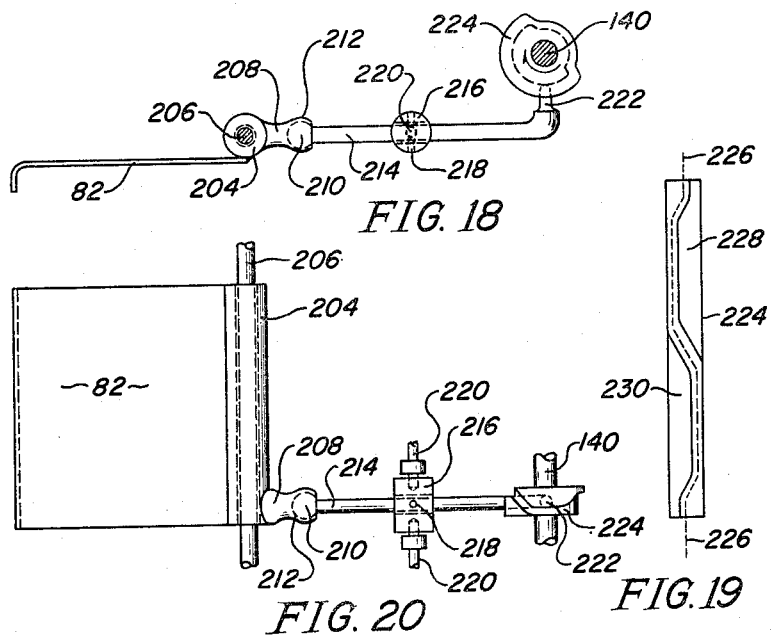
INVENTOR.
PARKER H. STORTZ
BY
AGENT.

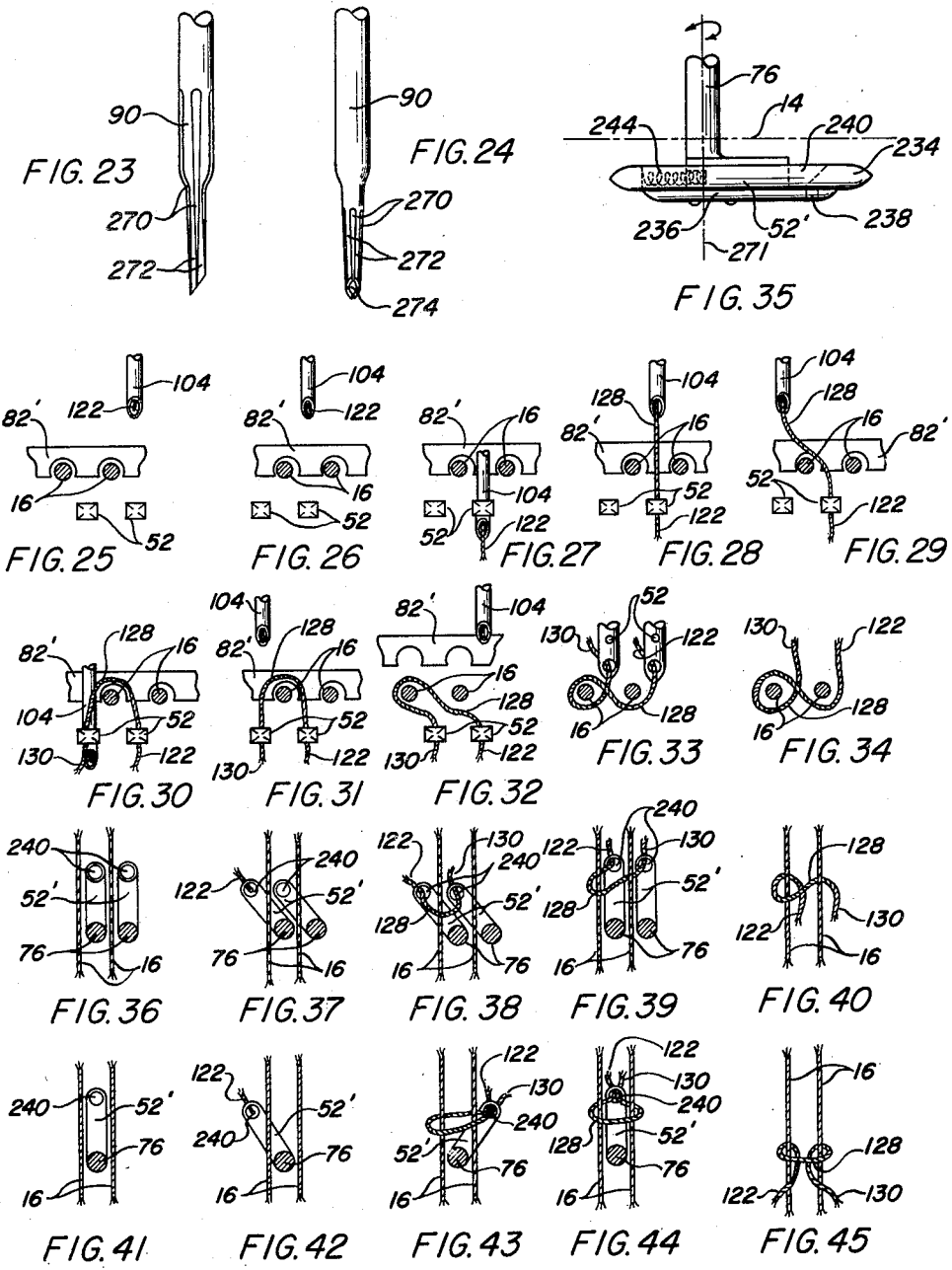

Patented May 19, 1953

2,638,933

UNITED STATES PATENT OFFICE 2,638,933

METHOD AND APPARATUS FOR PRODUCING PILED FABRICS

Parker H. Stortz, Glendale, Calif.

Application June 17, 1950, Serial No. 168,795

39 Claims. (Cl. 139—5)

This invention relates to a method and apparatus for weaving and in particular relates to the weaving of piled fabrics such as carpet. Specifically this invention is concerned with the production of carpet in which the pile of the fabric is secured to the backing by means of knots commonly known as the "Ghiordes" or Turkish knot or the "Senha" or Persian knot heretofore available only in imported hand-woven carpet of considerable expense.

In weaving fabrics there are two principal systems of yarns, those extending the length of the fabric and termed the warp and that traversing the warp at substantially right angles which is termed the weft, woof, or sometimes filling. The warp consists of a number of parallel yarns termed warp ends or merely ends forming a warp sheet. The weft yarn is interwoven into the warp sheet, passing under then over successive ends. On one traverse, the weft passes over a given warp end and on the subsequent traverse it passes under the same end forming a mesh of woven fabrics having a width determined by the number of warp ends in the warp sheet and the spacing between them. The length of the fabric is unrestricted in power-driven looms and may be made of considerable length by providing a source of long warp ends substantially the length of the fabric desired. In manually driven looms, the size of the frame usually determines the size of the fabric produced.

In the production of carpet or other piled fabrics, a woven material as above described is employed into which a pile is bound giving the carpet a weaving surface consisting of many tufts or loops. The woven fabric is termed the backing and is made in varying degrees of weight by inserting extra warp threads or yarns termed stuffer warp to increase the stiffness and the strength of the finished product.

In power-driven looms, the carpet produced may be provided with a pile consisting of loops or tufts depending upon the type of loom and the type of carpet. In the well-known Brussels type carpet, the pile consists of many loops of pile warp or yarn laid parallel with the warp ends in the warp sheet of the backing, the loops being brought up through the fabric at various intervals along the carpet in the direction of the warp. In the well-known Wilton type carpet, similar pile loops are woven into the backing but are subsequently cut leaving two free cut ends termed tufts as the pile. The prime disadvantage of the Brussels and Wilton weaves is that considerable high grade wool pile yarn lies buried in the backing between those parts of a given pile warp from which the loops are formed. As many as six such pile warp ends are employed, forming strong and durable carpet in which the pile is very securely bound, but which is expensive because of the relatively large quantity of pile warp required. In the equally well-known Axminster type carpet, the pile consists of tufts similar to those in the Wilton weave, but the difference lies in the absence of the large amount of buried pile warp. The pile tufts are short lengths of yarn which are each looped one-half turn around one or two of the weft yarns in the backing. Therefore a minimum of expensive pile yarn is required in such a carpet, but the pile is not so securely bound to the backing as in the Brussels or Wilton weaves and this is one of its disadvantages.

In handmade carpet, the tufts or loops of the pile are knotted to the backing, each one being tied individually to the warp ends. In such a carpet the pile is very well secured to the backing and only a moderately greater amount of pile yarn is required over that required in an Axminster type carpet. In many of the highest quality imported hand-woven carpets, the pile yarn is secured to the backing by means of the "Ghiordes" or Turkish knot or by means of either a left- or right-handed "Senha" or Persian knot. Both of these knots are tied from a short length of pile yarn and are tied around two of the warp ends. In the Ghiordes knot a length of pile yarn is laid transversely across a pair of warp ends with the free ends or tufts of the yarn brought downwardly on the outside of the pair. These free ends are then brought upwardly between the pair of warp ends on the same side of the piece of pile yarn lying across them. Thus, the two tufts are anchored to the warp ends by passing three-quarters of the way around a pair of them. Usually these warp ends are adjacent, but the knot may be tied on alternate ends. The Ghiordes knot is illustrated in Figure 14 of the drawings. In the Senha knot, the length of pile yarn is laid across a single warp end with the free ends or tufts brought downwardly as in the Ghiordes knot. One tuft is then passed around the single warp end and brought up while the other tuft is brought up after passing under an adjacent warp end. The Senha knot is also illustrated in Figure 14 of the drawings.

In these handmade carpets the quantity of pile yarn is considerably less than that required in a Brussels or Wilton type weave and only moderately more than in the Axminster type. The pile tufts are much more securely bound into the backing than in the Axminster type, in fact are as secure as in either the Brussels or Wilton types. Thus, except for the expense in producing such a handmade carpet, a carpet having the Ghiordes or Senha knotted pile combines the advantages of a minimum requirement of high quality pile yarn and a very secure bond between the pile tufts and backing of the above-named machine loomed carpet weaves without their named disadvantages. Further, such a carpet can easily be made in higher qualities, that is, having a great many more tufts of pile per square inch of finished material.

It is therefore a primary object of the present invention to provide a method and apparatus for tying the Ghiordes and Senha knots.

It is another object of this invention to provide a method and apparatus for weaving tufted fabrics in which the pile is secured to the fabric by means of a Ghiordes or Senha knot.

It is a more specific object of the invention to provide an improved non-manually operated and power-driven weaving apparatus for producing tufted fabrics such as carpet having Ghiordes or Senha knotted pile tufts.

Other objects and advantages of the present invention will become apparent to those skilled in the art as the description thereof proceeds.

Briefly, the present invention comprises a method of tying the Ghiordes or Senha knots in conjunction with the conventional methods of weaving fabrics whereby as the fabric is woven short lengths of a pile yarn are formed around the warp ends in the warp sheet of the fabric and are beaten up against the fell of the finished fabric with the weft or filling in the conventional manner. This method, as applied to forming a fabric with a Ghiordes knot, involves the steps of passing a first or leading tuft of a pile yarn through the warp sheet adjacent a pair of warp ends, securing the leading tuft at a point on one side of the warp sheet, severing a short length of yarn from the pile yarn forming a pile yarn filament, passing the second or trailing tuft of the pile yarn filament through the warp sheet on the other side of the pair of warp ends, securing this trailing tuft in the manner of the first, and then passing the two thus secured tufts of the pile filament back through the warp sheet between the adjacent pair of warp ends. As applied to forming the Senha knot, the steps of the method of this invention include passing the leading tuft of pile yarn through the warp sheet between a pair of warp ends, securing this leading tuft at a point on one side of the warp sheet, severing a short length of pile yarn forming a pile filament, passing the second or trailing tuft of the pile filament through the warp sheet on one side of a pair of warp ends, securing this trailing tuft in the manner of the first, passing the trailing tuft of the pile filament through the warp sheet between the pair of warp ends, and passing the leading tuft of the pile filament through the warp sheet on the opposite side of the pair of warp ends.

These steps are carried out with each adjacent pair of warp ends in the warp sheet, or if desired stuffer warp ends may be included in the warp sheet to increase the body of the backing. After each row of tuft knots has been formed across the warp sheet, a weft yarn is passed across the warp sheet alternately above and below adjacent warp ends and the weft and knots are beaten up against the fell by oscillating lay means conventional in weaving operations.

The apparatus by means of which the steps of the foregoing methods are accomplished involves a conventional loom with a loom beam from which the warp ends unwind, a cloth roll on which the finished fabric is wound up, and a warp sheet stretched between the beam and cloth roll. A plurality of heddles are provided, one for each warp end, by means of which the shedding of the warp sheet is effected. A pair of shuttle boxes and a shuttle are provided for passing the weft or filler yarn through the warp sheet as described simultaneously with the step of shedding the warp sheet. A lay is provided having a reed and shuttle race by means of which the knots and weft yarn are beaten up against the fell of the finished fabric after the shedding and picking steps.

In combination with this conventional loom is the apparatus of this invention in which a spreader is provided by means of which the warp ends are engaged (separated into adjacent pairs for the formation of the Ghiordes knot) and moved laterally a short distance in the plane of the warp sheet. A lifter is provided which passes from one side through to the other side of the warp sheet and between the individual warp ends of the adjacent pairs formed by the spreader. The lifter is provided with gripping or securing means for tufts of pile yarn by means of which the tufts passed through the warp sheet by the needles described below are secured on the other side of the warp sheet. A plurality of hollow pile yarn feeding needles are provided by means of which the pile yarn is passed through the warp sheet and introduced into and secured by the gripping means in the lifter on the opposite side of the warp sheet from the needles. The construction and operation of these needles and lifters will be more fully described hereinafter in connection with the annexed drawing.

The Ghiordes knot is formed around a pair of warp ends by separating the warp ends in the warp sheet into adjacent pairs, passing a lifter between the pairs, displacing the pair of warp ends to the left a distance approximating the warp end spacing by means of the spreader, passing a needle carrying a pile yarn through the warp sheet on one side of the displaced pair of warp ends, securing the first or leading tuft of a pile yarn in a lifter on the side of the warp sheet opposite the needles, severing a length of pile yarn forming a pile yarn filament having a second or trailing tuft, returning the warp ends to their original position, displacing the pair of warp ends to the right a distance approximating the warp end spacing by means of the spreader, passing the needle carrying the trailing tuft of the pile yarn filament through the warp sheet on the opposite side of the pair of warp ends, securing the trailing tuft of the pile yarn filament in the same lifter as the leading tuft, returning the warp ends to their original position by disengaging the spreader from the warp sheet, and moving the lifter containing the two secured tufts of the pile yarn filament back through the warp sheet between the adjacent pair of warp ends forming a Ghiordes knot around each pair of warp ends in the warp. In the apparatus, one lifter is provided for each pair of warp ends in the warp and a compound pile yarn needle system is provided for each lifter. The lifter is positioned on the opposite side of the warp from the needles before the formation of the knot begins and during the tying of the knot the needle passes through the warp into the gripping mechanism of the lifter. After two such movements of the needle through the warp (one to secure each of the two tufts of the pile filament) the lifter containing the two secured tufts of the pile yarn filament is moved back through the warp sheet between the pair of warp ends and the knot is formed.

The Senha knot is formed around a pair of warp ends in the same apparatus using a slightly different sequence of operations including passing a lifter through the warp sheet on the right side of each wrap end, displacing the warp ends to the right a distance approximating the warp end spacing by means of the spreader, passing a needle carrying a pile yarn through the warp sheet between the displaced pair of warp ends, securing the first or leading tuft of a pile yarn in the right hand lifter, severing a length of pile yarn forming a pile yarn filament having a second or trailing tuft, moving the needle containing the trailing tuft to the left a distance approximately equal to the warp end spacing, passing the needle through the warp sheet on the left side of the left warp end of the pair of warp ends, securing the second end of the pile filament in the left-hand lifter, returning the warp ends to their original position, passing the left-hand lifter through the warp sheet between the pair of warp ends, and passing the right-hand lifter through the warp sheet to the right of the right warp end. Since Senha knots may be tied left-handed or right-handed, the left-handed knot may be tied by the method as given immediately above wherein the words left and right are substituted for each other.

In making the Senha knot, the needles are movable laterally with respect to the warp sheet as well as movable through it. In one modification of the operations of tying the Ghiordes knot, the needles are also displaced laterally in the same manner as above. In the Senha knot one lifter is passed through the warp sheet at one side of each warp end, whereas in the Ghiordes knot one lifter is passed between alternate pairs. As will be seen in the description of the drawings, a single apparatus is provided by means of which either of these knots may be made in securing a short length of pile yarn into a woven backing of a tufted fabric such as carpet.

Figure 3:
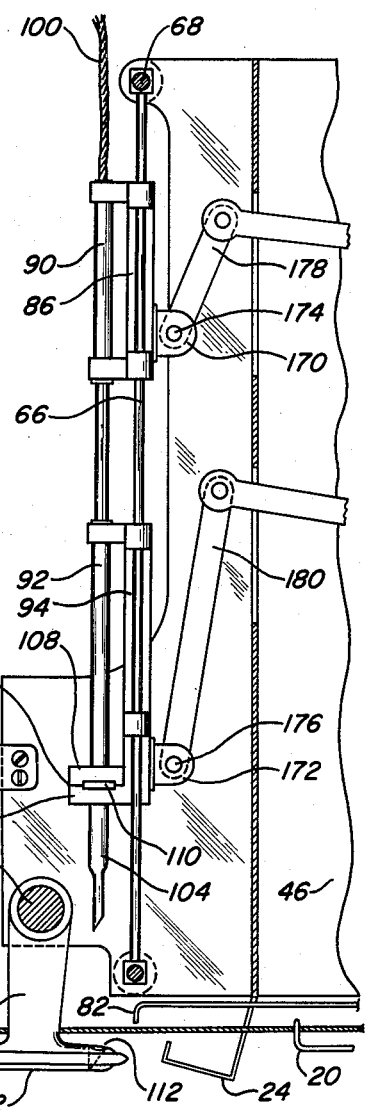

In the annexed drawings, the various figures of the apparatus of the present invention are of a working model applying the methods described above. The apparatus in operation produces a tufted carpet having 8 warp ends in the warp sheet and employs four tuft lifters in making the Ghiordes knot (8 are required when making the Senha knot) and four compound pile yarn needles are used in either case. There are 46 figures in the drawings in which:

Figure 1 is a general perspective view of one modification of the apparatus of this invention, Figure 2 is a front elevation view of the compound pile yarn feeding needles showing their relation to the lifters, spreader, and warp sheet, Figure 3 is a side elevation view of the apparatus shown in Figure 2, showing the relation of the pile yarn feeding needles to the lifters, spreader, heddles, and shuttle race, Figures 4 through 13 show the sequence of operations of the needles, spreader, and tuft lifter in which a Ghiordes knot is formed on the warp ends, Figure 14 shows the Ghiordes and Senha knots formed on the warp ends as described above with the weft or filling also shown, Figures 15 and 16 show the linkage by means of which the pile yarn passing through the pile yarn feeding needles is severed to form the pile filament, Figure 17 shows the linkage by means of which the needle carriages are moved through the warp sheet, Figures 18 through 20 show several views of the spreader and the linkage by means of which it engages and displaces the warp ends, Figures 21 and 22 show the detail of the tuft lifters and the gripping mechanism and the linkage whereby they are actuated, Figures 23 and 24 show in detail the slotted inner or primary pile yarn feeding needle in which the yarn is held by fingers, Figures 25 through 34 illustrate the operations in one modification of the Senha knot, Figure 35 shows an elevation view of a special tuft lifter, the use of which permits forming Senha and Ghiordes knots without the use of the spreader, Figures 36 through 40 show the steps involved in forming a Senha knot by use of the special tuft lifter, Figures 41 through 45 show the formation of a Ghiordes knot using the special tuft lifter, and Figure 46 indicates the construction of "caterpillars" of Ghiordes knots secured to a single pair of warp ends.

Referring now more particularly to Figure 1, a general view in perspective of one modification of the apparatus of the present invention is shown and provided with loom beam 10 and clotch roll 12 with the warp sheet 14 stretched between. In this modification drawn after the model 8 warp ends or yarns 16 are employed. Arranged below warp sheet 14 are heddles 18 each provided with an eye 20 shown more clearly in Figure 3 and through which eye a single warp end is passed. In front of the heddles and lying transverse to the warp sheet is shuttle race 22 provided with shuttle boxes 24 and 26. A shuttle 28 is provided by means of which weft or filler yarn 30 is shot or thrown in the picking operation back and forth through the shed formed by the heddles in the warp sheet. A conventional lay is provided consisting of lay swords 32, reed 34 consisting of a plurality of parallel steel wires between each adjacent two of which a warp end passes. The lay oscillates about the axis of rocker-shaft 36 between the position shown at 38 and that at 40. During the time the knots are being formed the lay rests in position 38 and after the shuttle has been thrown and the weft passed through the shed formed in the warp sheet by the heddles, the lay is moved into position 40 in the beating up operation and forces the knots and weft up against fell 42 of the finished fabric 44 on cloth roll 12. The lay then returns to position 38. Thus far the description is of a conventional weaving machine for weaving untufted fabrics.

Situated above the warp sheet and secured to the frame of the loom are side frames 46 and 48 supporting pile yarn feeding needles 50 and lifters 52. Linkage 54, described more in detail in conjunction with Figures 15 and 16, operates the shearing mechanism for severing the pile yarn filaments from which the knots are formed. At the top of side frames 46 and 48 is a bank of pile yarn spools 56 from which the pile yarn passes down into the top openings of the needles.

In operation, lifters 52 are moved downwardly from the position shown and pass through the warp sheet 14. Needles 50 rise and fall, their lower extremities, not shown here, passing through warp sheet 14 and engage and disengage with and from lifters 52. After the knots are formed and the tufts thereof are engaged in lifters 52, the alternate heddles move pulling the alternate warp ends out of the warp sheet 14 forming a shed, a triangular-shaped opening in a side elevation view of the warp sheet. The shuttle is shot through the shed thereby passing one pick of the weft or filler yarn through the warp sheet. The even numbered heddles operate one time and the odd numbered ones operate the next time thereby weaving the weft into the warp to form the backing fabric, and with each beating step a weft yarn and a row of knots is beaten up into the finished fabric.

Figure 1 is intended to show the general relation between the conventional portions of the apparatus and the apparatus of the present invention by means of which the knots are formed in the warp sheet.

Referring now more particularly to Figure 2, a front elevation view of the compound pile yarn feeding needle is shown. In actuality the pile yarn feeding needles consist of three parts with a smaller diameter primary needle reciprocable within a larger diameter secondary and a tertiary needle. The function of the primary needles is to carry the pile yarn, the function of secondary needles is that of a guide for the primary needles, and the function of tertiary needles is to engage the tuft lifters and open the tuft gripping mechanism while the primary needles inject the leading tuft of the pile yarn into the gripping mechanism. In the figure, side frames 46 and 48 are again shown. Cross members 60 and 62 at the upper and lower extremities of the side frames are provided to support needle carriage guides 64 and 66. Cross members 60 and 64 are movable laterally, being provided with shafts 68 and 70 and with bearing guides 72 and 74 respectively so that the carriage guide rods may be moved from side to side under the actuation of cams 61 and 63 as required when forming the Senha knots and in one method of weaving in which the Ghiordes knots are "staggered" in the fabric. Such a transverse movement is not otherwise required in the Ghiordes knot operation and when this knot is being tied successively upon the same two warp ends, shafts 68 and 70 are locked in position and cams 61 and 63 are not moved.

In the lower part of Figure 2 are shown lifters 52 extended through warp sheet 14 in which eight individual warp ends 16 are employed. Lifters 52 pass through between adjacent pairs of warp ends as shown and are supported by arms 76 made integral with lifter shaft 78. This shaft is provided with journals turning in bearings 80 held on side frames 46 and 48. Spreader 82 is placed as shown immediately adjacent warp sheet 14 and provided with teeth 84 between which are engaged pairs of warp ends 16 as described for tying the Ghiordes knot. In the Senha knot the spreader is preferably toothed to engage individual warp ends.

In the upper part of Figure 2 primary needle carriage 86 is provided which rides by means of bearings 88 on guide rods 64 and 66. Primary needles 90 are supported on carriage 86 and their lower extensions pass within secondary needles 92 which are supported on secondary needle carriage 94 also riding by means of bearing 96 on guide rods 64 and 66. Pile yarn 98 is conducted from the sources shown in Figure 1 or other sources into the upper inlet openings 100 of the primary needles 90, passing through the primary needle to be introduced into and gripped in the gripping mechanism of lifters 52 as subsequently shown and described in considerable detail.

Carried upon the lower part of secondary needle carriage 94 is shear mechanism 102 by means of which the pile yarn is severed at that point leaving a short length of pile yarn or pile filament gripped in lifter 52 and extending through the warp sheet into the open extremity of the tertiary needle. The secondary needles 92 on one side of the shear 102 are provided with extensions on the opposite side of the shear which extensions are designated tertiary needles 104. Tertiary needles 104 are carried by the lower member 106 of the shear mechanism while the lower extremities of the secondary needles 92 are held in upper member 108 of the shear mechanism, this being more clearly shown in any one of Figures 4 through 13 subsequently described. A milled slot in the facing surfaces of members 106 and 108 provides space for shear plate 110 which extends outwardly from members 106 and 108 to engage shear plate activator pin 112. By means of the linkage shown in Figures 15 and 16 the shear plate is moved at the proper time severing the pile yarn within the secondary needle between the secondary and tertiary parts thereof while the opening of primary needle 90 is moved to a point a short distance away from the shear mechanism.

Thus, as will become apparent following a description of Figures 4 through 13, tertiary needles 104 open the pile yarn gripping mechanism of lifter 52, the primary needles carrying a pile yarn insert the leading tuft of a pile filament into the gripping mechanism of the lifter, primary, secondary and tertiary needles withdraw from the lifter, shear plate 110 moves shearing the pile yarn within the shear and a short length of pile yarn or pile filament is left extending through tertiary needles 104 and through warp sheet 14 into lifters 52. Since the primary needles 90 move to a point apart from the shear plate before the yarn is sheared, the leading tuft of the subsequent pile yarn filament is left extending from the outlet opening of the primary needles and it is this tuft which is injected into the gripper mechanism of the lifter upon starting the next knot.

Referring now more particularly to Figure 3, a side elevation view of the apparatus of this invention shown in Figure 2 is shown. Parts of the apparatus shown in Figure 2 which are also shown here are denoted by the same numbers. In this view the location of shear plate 110 within members 106 and 108 is shown. The bevelled lower opening of tertiary needles 104 is shown and their direct alignment with opening 112 of the gripper mechanism in lifter 52 is clear. The two positions of lifter 52 are shown, wherein the lifters are passed through the warp sheet and their withdrawn position denoted 52a in which position the tufts are pulled free or are otherwise released from gripper mechanisms in lifters 52. The angular movement of the lifter shaft 78 is about 90° in this model but this is not critical except that it be sufficient to move the lifters far enough from the warp sheet as not to interfere with the movement of the oscillating lay.

In Figure 3 is also shown backstop 114 suspended from bracket 116 and provided with adjustment screw 118. By the proper adjustment of screw 118, backstop 114 can be so placed in relation to the motion of lifters 52 that when the latter are withdrawn from the warp sheet the gripper mechanism will be automatically opened (shown more clearly in Figure 22) by a slight movement of the movable of element 234 (of Figure 22) thereby releasing the gripped tufts of the knots just after they are passed through the warp sheet and just before the beating up step described above. This is not absolutely necessary, however, since it has been found that the tufts will pull free from the lifters with a proper tension spring as subsequently described.

Needle carriages 86 and 94 are shown provided with activating linkages by which they are moved along guide rods 66. These linkages are cam driven as shown more clearly in Figure 17 and the restoring forces may be applied to the carriages in several ways. One is to apply a suitable radial force at the cam to keep the follower in contact with the cam bearing surface. In this model the carriages were spring loaded by springs not shown, but extending from each needle carriage to the top of side frames 46 and 48 in an obvious manner. It is preferable to have positive moving and restoring forces applied to the carriages as by means of cams.

A very desirable modification of tertiary needles 104 and of primary needles 90 involves the use of thin-walled cylindrical tubes of constant inside and outside diameter throughout their entire length.

Referring now to Figures 4 through 13, a series of elevational views of primary needles 90, secondary needles 92, tertiary needles 104, shear mechanism 110, gripper and lifter mechanism 52 and spreader 82 is shown. In these figures similar parts of equipment are denoted by numbers used above. Here is shown in ten figures the detailed sequence of the movements of the compound yarn feeding needles, the spreader, the shear, and the lifter whereby the Ghiordes knot is tied around a pair of adjacent warp ends.

Figure 4:
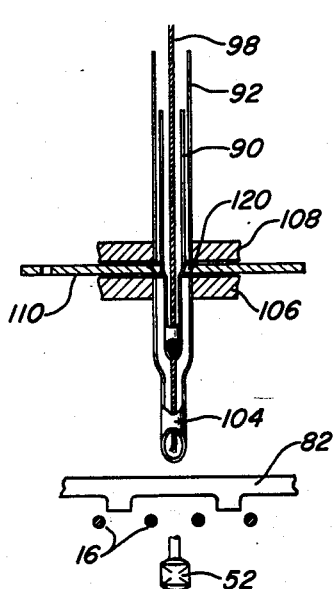

In Figure 4 the starting position is shown with warp ends 16 spaced their normal distance in the warp sheet, lifter 52 lowered between each pair of warp ends around which the Ghiordes knot is to be tied, spreader 82 spaced from the warp sheet a short distance, primary needle 90 and secondary and tertiary needles 92 and 104 spaced from the warp sheet. It is to be noted that pile yarn 98 extends entirely through the inner needle 90 and as far as the outlet opening of tertiary needle 104. From the sequence of operations it will be seen that this is attained by shearing the pile yarn when the lower opening of inner needle 90 is spaced the same distance from the shear plate 110 as the distance between the lower opening of inner needle 90 and tertiary needle 104 in this starting position. It will also be noted that the shear consists of a bevelled opening 120 in shear plate 110 and that upon a lateral movement of shear plate 110 through a distance equal to or greater than the minimum diameter of opening 120, pile yarn 98 extending through opening 120 is severed as shown more clearly in Figure 9 described subsequently.

Figure 5:
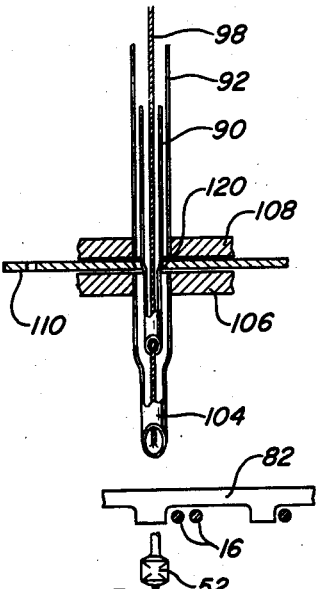

In Figure 5 spreader 82 has engaged a pair of warp ends 16 and displaced them to the right a sufficient distance so they are out of direct line between tertiary needle 104 and lifters 52, the distance being approximately that between individual warp ends, i. e., the warp end spacing.

Figure 6:
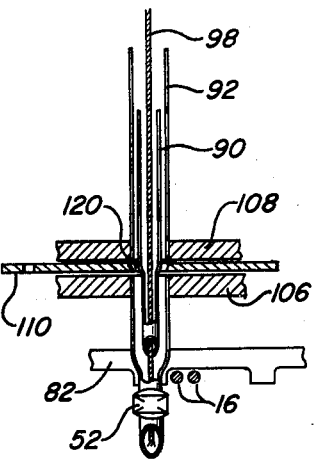

In Figure 6 the inner and outer needles have passed through the warp sheet at approximately the same speed so that tertiary needle 104 engages lifter 52 and there is no direct contact between lifter 52 and primary needle 90 carrying the pile yarn.

Figure 7:
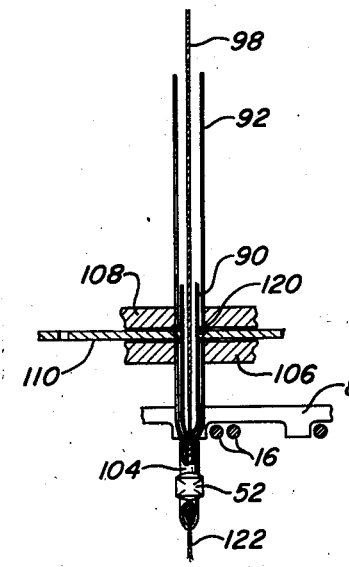

In Figure 7 the inner needle 90 is shown extended fully through the warp sheet and into lifter 52 so that the outlet openings of needles 90 and 104 are coincident with leading tuft 122 of pile yarn extending from the outlet opening of needle 90.

Figure 8:
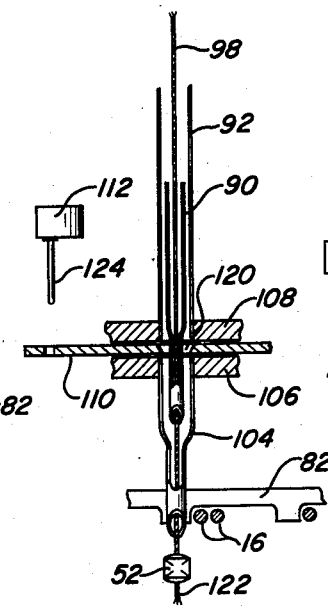
Figure 9:
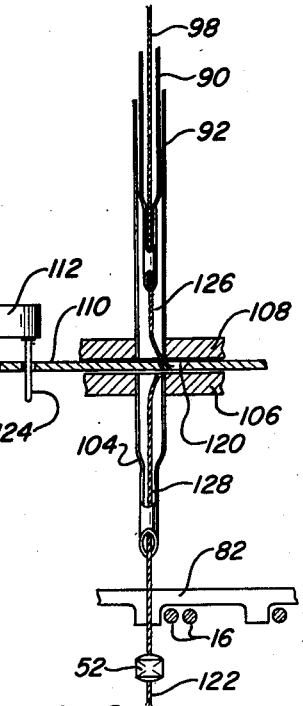

In Figure 8 the needles then begin to withdraw at approximately the same speed from lifter 52 until upon the removal of tertiary needle 104 the gripper mechanism in lifter 52 closes on leading tuft 122 holding it while the inner and tertiary needles progress toward the position shown in Figure 9. During this progression the pile yarn in primary needle 90 is held by lifter 52 while the inner needle rises thus pulling the pile yarn relatively through the primary needle.

In Figure 9 tertiary needle 104 has returned to the same position as it started as shown in Figure 4 whereas primary needle 90 has moved to a position farther from the warp sheet than its starting position. The distance between the outlet opening of primary needle 90 and shear plate 110 is the distance which tuft 122 extends out of the opening of tertiary needle 104 shown in Figure 7. Shear activator linkage 112 provided with activator pin 124 engages an opening in shear plate 110 upon the withdrawal of the needles away from the warp sheet. When inner needle reaches its maximum distance from shear plate 110, activator 112 operates pushing shear plate 110, cutting the pile warn extending out of inner needle 90 forming another leading tuft 126 similar in length to that of tuft 122 shown in Figure 7 and leaving a short length or filament of pile yarn 128 in tertiary needle 104. It is from this filament of pile yarn that the Ghiordes knot is formed.

In Figure 10 the needles have not moved, but spreader 82 has returned the warp ends to their normal parallel position and then further moved them to the left a distance sufficient to move the pair of warp ends 16 out of line between needle 104 and lifter 52, again a distance approximating the warp end spacing. This movement pulls pile filament 128 out of needle 104 somewhat as indicated.

In Figure 11 tertiary needle has again penetrated the warp sheet and entered the gripper mechanism of lifter 52. Simultaneously inner needle 90 descends a sufficient distance so that leading tuft 126 aids in expelling the trailing tuft 130 of filament 128 from the outlet opening of tertiary needle 104. This figure shows filament 128 encircling warp ends 16 with its leading and trailing tufts 122 and 130 engaged along with tertiary needle 104 in the gripper mechanism of lifter 52. The leading tuft 126 of the subsequent filament is shown extended just to but not beyond the opening of the tertiary needle. In this manner the leading tuft 126 of the subsequent filament expels the trailing tuft 130 of filament 128 and is not in a position to be gripped by the gripping mechanism. The inner and outer surfaces of tertiary needles 104 are highly polished and thereby eliminating any tendency for the leading tufts to hold up inside the tertiary needles nor for the tertiary needles to disengage leading or trailing tufts from the lifter after being inserted. No such adverse action has been encountered with needles and gripping mechanisms of the type shown.

In Figure 12 the inner needle 90 and outer needle 92 and tertiary needle 104 are shown to have returned to the starting position as in Figure 4. Spreader 82 has disengaged the warp ends 16 allowing them to return to their starting position parallel and straddling the axis extending from the pile yarn needles through the gripper mechanism in lifter 52. Pile filament 128 encircles warp ends 16 in such a position that there is space between the ends for passing lifter through therebetween.

In Figure 13 lifter 52 is shown after passing between the pair of warp ends thus forming a Ghiordes knot. As previously stated the tufts of the pile filament held in the gripper of the tuft lifter may be adjusted so that upon such a motion of the lifter, the tension on the pile filament will pull the tufts 122 and 130 free of the gripper, or a backstop may be provided as shown in Figure 3 to open the gripper leaving the pile filament knotted around the warp ends as shown.

In Figure 14 several Ghiordes knots are shown with warp ends 16 and weft or filler yarns 30 toward the front of the figure. At the back is depicted the Senha knot which also may be tied with the apparatus of the present invention in a modified operation.

A satisfactory carpet has been obtained having eight warp ends and approximately 40 Ghiordes knots per squire inch. This carpet may be prepared by forming a series of such knots in succession around each adjacent pair of warp ends, that is for example ends 1 and 2, 3 and 4, 5 and 6, etc. as indicated by knots 132 and 134 in Figure 14. By displacing the needle carriage guide rods, the spreader 82 and the tuft lifters 52 laterally with respect to the warp sheet a distance about equal to the spacing of the warp ends after the completion of one row of knots, the next row of knots will be formed on ends 2 and 3, 4 and 5, 6 and 7, etc. as indicated by knots 136 and 138 in Figure 14. The subsequent row is then made with knots on warp ends 1 and 2, 3 and 4, etc. as before. This is a modification of operation contemplated by this invention wherein in producing carpet with a Ghiordes knotted pile the knots are "staggered" along the warp as indicated. This lateral motion of the needle carriages is imparted by means of members 60, 61, 62 and 63 shown in Figure 2 described above and also may be utilized in using the apparatus of this invention in forming carpet or other tufted pile fabrics with the Senha knot.

Referring now to Figures 15 and 16, a side elevation and plan view respectively are shown of the cam drive, mechanical linkages, and actuator for the pile yarn shear by means of which, as indicated above, short lengths or filaments of pile yarn are severed and with which filaments the Ghiordes and Senha knots are formed.

In the drawings, cam shaft 140 is provided to which spring loaded shear cam 142 is secured. During operation, cam 142 makes one rotation for each row of knots tied. Cam follower 146 secured by means of pin 148 to clevis 144 is integral with shaft 150. This shaft is restricted from motion except longitudinal by means of guide 152. Shaft 150 is attached to shear actuator 112 (also shown in Figures 8 and 9) by means of clevis 160 and pin 162 through link 158 and clevis 164 and pin 166. Shear actuator 112 passes through side frame via aperture 156 and is permitted angular motion around pivot pin 168 supported by brackets 169. Pin 124, also shown in Figures 8 and 9, depends from actuator 112. As described this pin 124 engages shear plate 110 when the needle carriages are furthest from the warp sheet. The setting of shear cam 142 upon cam shaft 140 is such that at the proper time a longitudinal movement of short duration is imparted to shaft 150 which is imparted via link 158 to shear actuator 112 which in turn quickly moves shear plate 110 within the shear assembly severing the pile yarns as shown in Figures 8 and 9 especially. The shape of shear cam 142 determines the speed of motion of shear plate 110 of course and it is desirable to shear the pile filaments as quickly as possible.

Referring now to Figure 17, an elevation view of the linkage typical of that which may be used to drive the needle carriages is shown. Reference is made also to Figure 3 in which the carriages and attached driving linkages are also shown. In reference to both figures, the needle carriages are provided with clevises 170 and 172, provided respectively with pins 174 and 176. To these are attached links 178 and 180 respectively. In Figure 17, link 182 may be either link 178 or 180 shown in Figure 3. Link 182 is attached by means of pin 184 to lever or rocker arm 186 which oscillates about fulcrum 188 supported in bracket 190. Lever 186 is provided at the opposite end with cam follower 192 held in clevis 194 by means of pin 196. Follower 192 rides in contact with needle carriage cam 198 which is also secured to cam shaft 140 and rotates at one revolution per row of knots tied. This cam is provided with two raised portions since the needle carriages make two motions through the warp sheet in forming each knot. By varying the shape of this cam, the distance which primary needle travels away from the shear may be varied and thereby the length of the pile filament and the depth of pile in the finished carpet is also varied. Means such as spring 200 is provided as a restoring force for the needle carriages, or a spring may be directly attached to each needle carriage, or other means of direct drive may be employed. The driving mechanism for both needle carriages may be substantially as shown in Figure 17.

Referring now to Figures 18, 19, and 20 a side elevation of the spreader and its actuating linkages, a layout of the cam bearing surface, and a plan view of the spreader, respectively, are shown. Figures 18 and 20 are described together. In these figures, spreader 82, also shown in Figures 2 and 3, is attached to sleeve 204 which rides in movable relation on stationary shaft or guide 206. Sleeve 204 is further provided with arm 208 having a ball 210 and socket 212 connected with shaft 214. Shaft 214 rides in fulcrum 216 which permits rocking motion of shaft 214 in two planes substantially right angles by means of wrist pins 218 and 220. Shaft 214 is further provided with cam follower 222 riding on spreader cam 224, the latter secured to and rotating with cam shaft 140 referred to above. Upon rotation of cam 224 motion longitudinally along shaft 206 and angularly about the axis of shaft 206 is imparted to spreader 82. The shaft of cam 224 shown in Figure 18 is that required for tying the Ghiordes knot or the Senha knot.

In Figure 19 is shown an "unwound" view of the bearing surface or track of spreader cam 224 suitable for the Ghiordes knot operation. As the cam turns, the cam follower follows the path indicated by 226, moving first to the left as it meets raised guide 228 and then crossing the center plane of the cam to the right as it meets raised guide 230. In a spreader cam for the Senha knot, a raised guide having about twice the length of each of those shown is used and which displaces the spreader only from the center to one side and then back again to center. This is of course in the modification of the operation in which a lateral motion of the spreader is required.

Referring now to Figures 21 and 22, the detail of the lifter, pile filament gripper mechanism, and the lifter actuating linkage is shown. In Figure 21, lifter 52 indicated generally in Figures 1 to 13, is shown in a cross section of the end view as indicated in Figure 22. Lifter shaft 78, also shown in Figures 2 and 3, is provided with depending lifter arm 232 supporting the gripper mechanism. Arm 232 is provided with a milled slot on each side of its extremity in which gripper 234 rides supported by retainer 236 which is bolted to the extremity of lifter arm 232. Retainer 236 is provided with aperture 238 coaxially aligned with the axis of one of tertiary needles 104 shown in Figure 2 or 3. Gripper 234 is provided with aperture 240 having a bevelled face 242 of the same degree of bevel and parallel to the outlet openings in the extremities of tertiary needles 104 referred to above. Further, gripper 234 is provided with spring 244, the compression of which against member 234 is adjustable by means of screw 246. Thus when tertiary needles 104 enter the gripping mechanism the bevelled extremity contacts bevelled face 242, displacing gripper 234 against compression of spring 244, thereby opening aperture 238 so that the needle may enter. The leading tuft of the pile filament is thereafter injected from the opening of tertiary needle 104 by means of the primary needle as shown. Upon withdrawal of tertiary needle 104 and primary needle 90 the compressive force of spring 244 returns gripper member to its original position gripping the protrudent leading tuft securely between the adjacent edges of aperture 238 and gripper 234 at point 248. The adjusting screw 246 is provided to regulate the compression of spring 244 on gripper member 234 so that upon withdrawing the lifter from the warp sheet, the exertion of a slight tension upon the gripped pile filament tufts will slip them from apertures 238 and 240. As stated before this release of the tuft can be accomplished by means of a stop as shown in Figure 3 whereby gripper 234 upon withdrawal of the lifter from the warp sheet contacts stop 114 (Figure 3) compressing spring 244 and thereby releasing the grip on the tufts allowing them to slip from apertures 238 and 240. Either method performs satisfactorily in releasing the tufts from the lifter.

Lifter shaft 78 is further provided with crank lever 250 attached to actuating shaft 252 by means of clevis 254 and pin 256. Shaft 252 rides in pivoted bearing 258 which pivots about pin 260 and is provided at its other extremity with clevis 262 carrying cam follower 264 by means of pin 266. Follower 264 rides on tuft lifter cam 268 secured to and rotated by cam shaft 140. A spring restoring force may be applied to return them to the position shown in Figure 22, or other means may be employed. The angular relation of cam 268 to shaft 140 is such that following the formation of the knots on the warp ends, the shedding of the warp sheet, and the picking step, the lifter is actuated and is withdrawn from the warp sheet bringing the leading and trailing tufts of the pile filament from one side of the warp sheet to the other leaving the knots in their finished form. They are then beaten into the fell of the finished carpet as described.

In Figures 23 and 24 are shown two elevational views taken at right angles of the extremities of primary or inner needles 90 in which slots 270 are provided forming fingers 272 between them. These fingers are sprung inwardly forming a restricted opening 274. In this fashion, there is exerted a frictional force by fingers 272 against the pile filament which results in an improved injection of the leading tuft through the highly polished interior of tertiary needles 104 as well as permitting the use of a range of different plies of yarn without changing the primary needles in the apparatus. Thus, yarns having plies of from 2 as in light carpet yarn to as high as 8 or 10 may be used in the apparatus of this invention.

In producing tufted fabrics according to the method and apparatus of this invention in which the Senha or Persian knot is tied, the lateral movement of the needle carriage guide rods as described immediately above is employed. In forming this knot twice as many lifters are used as described above in connection with the tying of the Ghiordian knot since one lifter is passed through the warp sheet between each two warp ends. The same number of needles are required as before, i. e. one for each pair of warp ends. The knot is tied by passing the lifters through the warp sheet as stated, passing the leading tuft of a pile filament through the warp sheet between a pair of warp ends and securing it in a lifter, severing a short length of pile yarn forming a pile filament as in the Ghiordes knot, passing the trailing tuft of the pile filament through the warp sheet on one side of the pair of warp ends, securing the trailing tuft in the lifter next adjacent the first lifter, passing the last-named lifter gripping the trailing tuft through the warp sheet between the pair of warp ends, and passing the first-named lifter gripping the leading tuft of the pile filament through the warp sheet on the opposite side of the pair of warp ends. If desired, the leading tuft may be passed through the warp at one side of the pair of ends and the trailing tuft subsequently passed through between the pair, other steps being the same. The Senha knot is then released from the lifters, the picking step is performed in which the weft yarn is passed through the shed formed by the heddles in the warp sheet, and the oscillating lay beats the weft and row of knots up against the fell of the finished fabric, the steps being repeated in sequence.

There are two variations in the manipulation of the lifters, spreader, and needle carriage guide assembly by which the Senha knot may be tied. The first involves the lateral motion of the needle carriage assembly together with the lateral motion of the spreader. The second involves a lateral motion of the needle carriage assembly together with a displacement of the lifters.

In the first variation, a lifter is passed through the warp sheet next to each of the warp ends employed so that in this operation one less than the number of warp ends is the number of lifters required. Next the spreader provided with teeth to engage the warp ends individually contacts the warp sheet and displaces the ends to the right, for example, a distance approximating the center-to-center spacing of the warp ends. The compound pile feeding needle next passes through the warp sheet between the pair of warp ends and introduces the leading tuft into a lifter. The needles are then displaced to the left a distance approximating the warp spacing and injects the trailing tuft into the adjacent lifter. The needles are then withdrawn, the warp sheet returned to its original position, and the lifters passed through the warp sheet leaving a finished Senha knot.

In the second variation, a somewhat different lifter is employed which is passed through between a pair of warp ends as before and then the lifter arm is rotated about an axis extending through the warp sheet. The lifter is thus passed through the warp sheet to the left of a given warp end for example, the lifter arm is rotated, and the lifter gripper mechanism is thereby aligned with the needle passing through the warp sheet to the right of the warp end.

Thus in the second modification an angular displacement of the lifters in a plane parallel with that of the warp is used instead of a warp end displacement in tying the Senha knot. This angular displacement may be substituted in the method for tying the Ghiordes knot as described below.

In Figures 25 through 34 are shown a sequence of steps by means of which the first modification referred to above is used to tie the Senha knot. In Figures 36 through 40 the second modification using displaced lifters is used. In Figures 41 to 45 the displaced lifter is adapted to forming the Ghiordes knot.

In Figure 25 lifters 52 have passed through the warp sheet to the right of each of warp ends 16 shown. Spreader 82' has engaged the warp ends and tertiary needle 104 containing a leading tuft is ready to pass through the warp sheet between the pair of warp ends. Figure 25 corresponds to Figure 4 in respect to the position of the primary, secondary and tertiary needles.

In Figure 26 spreader 82' has moved the warp ends 16 to the right a distance about equal to the spacing between ends in the warp sheet.

In Figure 27 with the warp ends displaced to the right, tertiary needle 104 passes through the warp sheet between the warp ends and engages lifter 52 on the right, i. e. the right-hand lifter of the pair involved in a given knot. The leading tuft 122 emerges from tertiary needle 104. This position of the needles with respect to each other corresponds to that shown in Figure 7.

In Figure 28 the needles are withdrawn back through the warp sheet at which time the pile yarn is severed forming pile filament 128. The needle positions in this figure correspond to those in Figure 9.

In Figure 29 the needle carriages are displaced to the left a distance equal to the warp end spacing thereby aligning the tertiary needle 104 carrying the trailing tuft of pile filament 128 with the left-hand lifter of the pair involved. The needle positions correspond to those shown in Figure 10.

In Figure 30, the needles again pass through the warp sheet, this time on the left side of the left warp end and engage the left-hand lifter as shown. The trailing tuft 130 is injected into the lifter next adjacent the first of the pair. Pile filament 128 is thus passed halfway around the left warp end of the pair around which the knot is being formed.

In Figure 31, the needles withdraw from the lifter leaving the trailing tuft secured therein, and return to their starting position as indicated in Figure 32. The position of the needles corresponds to that shown in Figure 12 or 4.

In Figure 32 the needle carriages have been laterally to their starting position in alignment with the right lifter and spreader 82' is disengaged from the warp sheet.

In Figure 33 the lifters are passed through the warp sheet carrying the tufts with them and forming as shown in Figure 34 a completed Senha knot.

The formation of this knot involves the lateral displacement of the needle carriages referred to above similarly as employed in producing carpet in which staggered Ghiordes knots are tied. This is the first modification of operation for forming Senha knots and involves the same essential operations as described in connection with producing carpet with Ghiordes knots.

In the second modification a special type of lifter is used which is capable of an angular motion in a plane parallel to the warp sheet and which takes place after the lifter has passed through the warp sheet. In Figure 35 is shown an elevational view of the side of this lifter which is quite similar to the lifter detail of Figure 22. Lifter arm 76 is quite small, and cylindrical having a diameter a little less than the warp end spacing. The lifter 52' proper is relatively longer than the lifter shown in Figures 3 and 22. A rotation of lifter 52' about the axis 271 is thereby permitted which in turn permits this lifter to be passed through the warp sheet to the left of a given warp end, be rotated through the required angle, and aperture 240 aligned with the needle passing through the warp sheet to the right of the warp end. The operation of these lifters in the tying of the Senha knot, the second modification referred to above, is shown in Figures 36 through 40 in which plan views of the warp sheet are shown.

In Figure 36 a pair of lifters 52' is shown after being passed through the warp sheet, one each to the right of a pair of warp ends 16.

In Figure 37 an angular rotation of lifter arms 76 has effected an alignment of apertures 240 in lifter 52' with the needles passing through the warp sheet on the left side of each of the warp ends. The leading tuft 122 has been secured in the gripper aperture 240 of the left lifter.

In Figure 38 a displacement to the right of the needles carriages has been effected and the trailing tuft 130 of pile filament 138 has been secured in gripper aperture 240 of the right-hand lifter. Thus, pile filament 128 is held one-half turn around the left warp end of the pair of warp ends involved.

In Figure 39 the angular displacement of the lifters is released and they return to their original position parallel with the warp ends as they were.

In Figure 40 the lifters have been passed back through the warp ends, down and toward the viewer, forming the finished Senha knot.

In this modification there is no warp spreader action and the angular displacement of the tuft lifters described is used instead in conjunction with the displacement of the pile yarn feeding needles. It is to be understood that the single pair of warp ends and lifters used above in the description was so employed for simplicity and that in actual use of the apparatus of this invention, a plurality of needles and lifters are employed.

In Figures 41 through 45, which are plan views of the warp sheet, the special lifter described above is shown applied to the formation of a Ghiordes knot on a pair of warp ends and in which operation the spreader action is eliminated and a lateral displacement of the needle carriages is used as described above.

In Figure 41 lifter 52' is shown after having been passed through the warp sheet between the pair of warp ends 16 on which the knot is to be tied.

In Figure 42 the lifter is shown displaced to the left to bring gripper aperture 240 into alignment with a needle passing through the warp sheet to the left of the left warp end. Leading tuft 122 is shown engaged in gripper aperture 240.

In Figure 43 the lifter is shown after return to normal position and subsequent angular displacement to the right bringing it into alignment on the right of the right warp end with the needle formerly passed to the left of the left warp end. Trailing warp end 130 is thereby engaged in gripper aperture 240 with the leading tuft 122. Pile filament 128 is thus looped around the two warp ends and held in lifter 52'.

In Figure 44 the lifter is returned to its original angular position preparatory to being withdrawn from the warp sheet. In this withdrawal operation, the lifter passes downward and toward the viewer.

In Figure 45 the finished knot is shown after the lifter has been withdrawn from the warp sheet between the pair of warp ends 16.

In each of the foregoing descriptions of modifications of the formation of the Senha and Ghiordes knots, it is to be understood that the operations described are to be carried out in conjunction with the shedding of the warp sheet, picking the weft through the shed, and the beating up of the last row of knots and weft into the fell of the completed fabric. The modified lifter described immediately above is to be employed in place of the nonrotating lifter described in conjunction with Figures 3 and 22, especially. In a finished apparatus it is contemplated that the lifter shaft be provided with means for disengaging alternate lifters so that only half of them may be operated when tying the Ghiordes knot. This may be done by making the lifter shaft of a pair of concentric shafts with the odd numbered lifters mounted on one shaft and the even numbered lifters mounted on the other shaft. Thus one or the other of the shafts may be operated alone, or they may be operated together as in forming Senha knots.

As an example of the present invention for the production of tufted fabrics such as carpet, an operating model embodying the principles of the present invention was constructed and which was hand operated from a crank, this being the only manual operation involved. The warp sheet consisted of eight warp ends spaced $\frac{3}{32}$" center to center. The distance from the loom beam to the cloth roll was 21". In forming Ghiordes knots four systems of primary, secondary and tertiary needles were used. The primary needles were 7" long, $\frac{3}{32}$" inside diameter and $\frac{5}{32}$" outside diameter. The secondary and tertiary needles were 3¾" long, ⅛" inside diameter and $\frac{3}{16}$" outside diameter. The apparatus was operated with the warp sheet horizontal and with the plane of the pile yarn needles vertical. The maximum motion of the needles was about 1". The fabric produced was about $1\frac{3}{16}$" wide and pieces as long as 3 feet have been successfully obtained, however, longer lengths are entirely possible. The pile filaments usually used were about 2" in length and about 80 tufts per square inch of carpet was obtained. The fabric backing was satisfactory in body and the pile very securely woven into it. It was not possible to pull a tuft from the backing as the pile filament was broken first. The appearance of the working model is substantially as shown in Figure 1 with details of the primary, secondary, and tertiary needles as shown in Figures 2 and 3.

Although the present invention has been described in terms of a working model in which 8 warp ends and 4 pile yarn feeding needles were employed, it is to be understood that this is not to be construed as a limitation upon either the method or apparatus, but merely illustrative thereof. The principles of the present invention may be reproduced according to the present disclosure in looms capable of producing tufted fabric such as carpet 3, 4, 12, 16, 20, and 24 quarters or wider in width. Furthermore, in a weaving apparatus capable of a fabric of, for example, 24 quarters width or wider, by eliminating pile yarn from one or more selected pile yarn needles on the carriages and if desired by removing one or more pair of corresponding warp ends, any width may be woven up to width of loom. Several individual tufted fabrics of lesser width may be produced simultaneously if desired. For example, on a 20-foot loom, two 9-foot carpets may be produced side by side and which are connected by the weft yarns. Upon cutting and binding these between the two woven fabrics two carpets are produced from a single wide loom, thus new and unusual flexibility if operation is permitted.

It is further of interest that by eliminating the picking step from the operation described, a plurality (equal in number to the number of pile yarn needles operating) of so-called "caterpillars" as shown in Figure 46 consisting of a pair of warp ends 280 and 282 with a continuous line of Ghiordes knots 284, 286, 288 et cet. may be obtained. Such products are of value in the manufacture of chenille fabrics in which the "caterpillars" are sewn or woven into blankets, carpets, or other fabric. If desired, such a product may be produced consisting of three warp ends in which the Ghiordes knots are staggered; that its first two knots on ends 1 and 2, 2 and 3; then one knot on ends 2 and 3; then two knots again on ends 1 and 2, 2 and 3. This principle of staggering the Ghiordes knot may be applied to wider "caterpillars" having 4 or 5 or more warp ends, however, that one having only two is usually made.

The present invention includes the production of carpet or other tufted fabrics in which stuffer warp yarn is inserted with the warp ends and woven into the backing fabric with the weft yarn.

In the present specification the term "tuft" is intended to indicate the severed or sheared or otherwise cut end of a piece of yarn. The term "pile filament" is intended to indicate the short piece of pile yarn from which the knot is formed and which is severed from the main source of supply within secondary and tertiary needles indicated. The term "leading tuft" is intended to indicate the first end of yarn or tuft to emerge from the primary needle or in other words the first tuft placed or secured in the gripping mechanism of the tuft lifter. Analogously, the term "trailing tuft" indicates the other end of the pile filament or that end which is second placed in the gripping mechanism. The term "compound pile yarn feeding needles" is intended to indicate the primary, secondary and tertiary needles which are arranged co-axially as described.

In forming the Ghiordes knots in a tufted fabric or carpet, the number of lifters required is equal to one-half of the number of warp ends in the fabric produced and the number of needles is the same, i. e., equal to one-half the number of warp ends in the warp. When forming the Senha knot, the number of lifters required is one less than the number of warp ends in the warp and the number of compound needles required is the same as in the Ghiordes knot, one-half the number of warp ends.

In producing fabrics tufted with the Ghiordes knot it is preferred to employ a warp having an even number of warp ends to which knots are secured. This number does not include stuffer warp added to increase the body of the backing. In producing fabrics having the Senha knot, the number of warp ends to which knots are secured is also preferably even.

The operation of the spreader in tying the Ghiordes and Senha knots is to displace the warp ends in the warp back and forth through the axis denoting the needle travel through the warp into the lifters. Of course the actual distance which the spreader moves the warp to effect this displacement depends upon the relative positions of the axis, the spreader, and the lifter arms which extend through the warp. The reference in this description and in the claims to displacement of the warp ends a distance approximating the warp spacing is intended to mean such a displacement along a line in the plane of the warp sheet and perpendicular to the individual warp ends which passes through the axis of the needle travel through the warp sheet. Such displacement is desirably at least equal to the warp end spacing, it may be somewhat more, but should not be materially less than this so that the tertiary needles contact the displaced warp end.

In the present description of the apparatus of this invention, the plane of the warp has been shown horizontal and the plane in which the compound pile yarn feeding needles operate has been shown vertical. This is not intended to be a limitation on this apparatus, since the operation is such that it can be successfully carried out with non-horizontal warp sheets and non-vertical movement of the needles. In another modification, a vertical warp sheet may be used in which the plane of the needle movement is horizontal or even somewhat angular with respect to the warp sheet. All that is required is that the needles pass through the warp, they needn't necessarily pass up and down.

A single lifter shaft is shown in the drawings which is particularly convenient in the forming of the Ghiordes knots since lifters are only required between each pair of warp ends. In tying the Senha knot where lifters are required between each warp end when knots are being formed on each pair of ends, it is convenient to employ two or more lifter shafts which are substantially parallel so that somewhat larger lifters may be employed thereby eliminating a requirement of very small and intricate mechanism for gripping and lifting the tufts through the warp. Such plural lifter shafts operate together and may be constructed so that all the apertures in the lifters for receiving the tertiary needles are aligned in the plane of the needle movement on the opposite side of the warp.

Although the lifters are shown depending from a shaft which is cam operated, they may depend from a cross bar which is operated by hydraulic cylinders in a more or less nonangular or linear motion through the warp.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for producing tufted fabrics which comprises establishing a warp sheet consisting of a plurality of parallel warp ends, passing the leading tuft of a pile filament through the warp sheet, securing the leading tuft thus passed, subsequently passing the trailing tuft through said warp sheet, securing the thus passed trailing tuft and forming a knot with said pile filament secured to at least two of said warp ends by passing the secured leading and trailing tufts back through said warp sheet.

2. A process for producing tufted fabrics which comprises passing the leading tuft of a pile filament between a pair of warp ends in a warp sheet, securing said leading tuft in a stationary position, subsequently passing the trailing tuft of said pile filament through said warp sheet between another pair of warp ends, securing the trailing tuft thus passed and then returning the thus secured leading and trailing tufts through the warp sheet, each of said leading and trailing tufts returning between a pair of warp ends different from the pair between which the said leading and trailing tufts respectively were originally passed thereby forming knots of pile yarn secured to the said warp ends.

3. A process according to claim 2 wherein said knot is a Ghiordes knot.

4. A process according to claim 2 wherein said knot is a Senha knot.

5. A process for securing a tufted pile by means of Ghiordes knots to a woven fabric which comprises maintaining a warp sheet consisting of a plurality of parallel warp ends, dividing said warp ends into pairs, passing the leading tuft of a pile filament through said warp sheet to one side of each of said pairs, securing the thus passed leading tuft in a stationary position, passing the trailing tuft of said pile filament through said warp sheet on the other side of each of said pairs, securing the trailing tuft on the same side of said warp sheet as said leading tuft and forming a Ghiordes knot on each of said pairs of warp ends by returning the thus secured leading and trailing tufts of pile filament through said warp sheet between the individual warp ends of each of said pairs.

6. A process for securing a tufted pile to a woven fabric by means of Ghiordes knots which comprises maintaining a warp sheet consisting of a plurality of parallel warp ends, maintaining a source of supply of pile yarn on one side of said warp sheet, segregating said warp ends into a plurality of adjacent pairs, passing the leading tufts of a plurality of individual pile yarns through said warp sheet one each of said plurality to one side of each of said pairs, securing each leading tuft on the side of said warp sheet opposite to said source of pile yarn supply, severing a length of pile yarn from each of said pile yarns forming a plurality of pile filaments with their leading tufts secured on one side of said warp sheet and extending therethrough to plurality of newly formed trailing tufts on the opposite side thereof, subsequently passing said trailing tufts through said warp sheet one each on the opposite side of each of said pairs of warp ends, securing each of said trailing tufts at the same point with its corresponding leading tuft and forming a Ghiordes knot from each of said pile filaments by returning the secured leading and trailing tufts of each of said pile filaments through said warp sheet between the individual warp ends of said pairs.

7. A process according to claim 6 in combination with the subsequent successive steps of shedding said warp sheet, picking a weft yarn through the shedded warp sheet, closing the shedded warp, beating the plurality of Ghiordes knots and said weft yarn up against the fell of finished fabric, subsequently forming another plurality of Ghiordes knots and repeating the steps in succession to produce a tufted fabric.

8. A process according to claim 7 wherein one row of Ghiordes knots is formed on separate warp end pairs consisting respectively of the first and second ends, measured from one edge of said warp sheet, third and fourth ends, fifth and sixth ends, etc., subsequently forming the next row of Ghiordes knots on different separate warp end pairs consisting respectively of the second and third ends, measured from said edge of said warp sheet, fourth and fifth ends, sixth and seventh ends, etc., and repeating these steps in alternation.

9. A process for securing the tufted pile to a woven fabric by means of Senha knots which comprises maintaining a warp sheet consisting of a plurality of parallel warp ends, maintaining a source of supply of pile yarn on one side of said warp sheet, segregating said warp ends into a plurality of adjacent pairs, passing the leading tuft of a pile yarn through the warp sheet between the warp ends of each pair thereof, securing each leading tuft on the side of said warp sheet opposite from said source of pile yarn supply, severing a length of pile yarn from each of said pile yarns forming a plurality of pile filaments with their leading tufts secured on one side of said warp sheet and extending therethrough to a plurality of newly formed trailing tufts on the opposite side thereof, subsequently passing said trailing tufts through said warp sheet one each on one side of said pairs of warp ends, securing each of said trailing tufts on the same side of said warp sheet as said leading tufts and forming a row of Senha knots by returning each trailing tuft of the plurality through said warp sheet between the corresponding pair of warp ends and returning each of the leading tufts of the plurality through said warp sheet on the opposite side of said pair of warp ends.

10. A process according to claim 9 in combination with the subsequent successive steps of shedding said warp sheet, picking a weft yarn through the shedded warp, beating the plurality of Senha knots and said weft yarn up against the fell of the finished fabric, subsequently forming another plurality of Senha knots across said warp sheet and repeating the steps in succession to produce a tufted fabric.

11. A process for securing a tufted pile by means of Senha knots to a woven fabric which comprises maintaining a warp sheet consisting of a plurality of parallel warp ends, passing the leading tuft of a pile filament through said warp sheet between each separate pair of warp ends, securing the thus passed leading tuft in a stationary position, passing the trailing tuft of said pile filament through said warp sheet on one side of each of said pairs of warp ends, securing the thus passed trailing tuft on the same side of said warp sheet as said leading tuft and forming a Senha knot on each of said pairs of warp ends by returning the thus secured leading tufts of pile filament through said warp sheet on the opposite side of the pair of warp ends and returning the thus secured trailing tufts of pile filament through said warp sheet between the individual ends of each of said pairs.

12. A process for securing a tufted pile to a woven fabric by means of Senha knots which comprises maintaining a warp sheet consisting of a plurality of parallel warp ends, maintaining a source of supply of pile yarn on one side of said warp sheet, passing the leading tufts of a plurality of individual pile yarns through said warp sheet, one each of said plurality between each separate pair of warp ends, securing each leading tuft on the side of said warp sheet opposite to said source of pile yarn supply, severing a length of pile yarn from each of said pile yarns forming a plurality of pile filaments with their leading tufts secured on one side of said warp sheet and extending therethrough to a plurality of newly formed trailing tufts on the opposite side thereof, subsequently passing said trailing tufts through said warp sheet one each to one side of each of said pairs of warp ends, securing each of said trailing tufts at a separate point adjacent the point at which its leading tuft is secured and forming a Senha knot from each of said pile filaments by returning the secured leading tufts through said warp sheet on the opposite side of said pair of warp ends and returning the secured trailing tufts through said warp sheet between the individual ends of each of said pairs.

13. A process according to claim 12 in combination with the subsequent successive steps of shedding said warp sheet, picking a weft yarn through the shedded warp sheet, closing the shedded warp, beating the plurality of Senha knots and said weft yarn up against the fell of finished fabric, subsequently forming another plurality of Senha knots and repeating the steps in succession to produce a tufted fabric.

14. A process according to claim 13 wherein one row of Senha knots is formed on separate pairs of warp ends consisting of the first and second ends measured from one edge of the warp sheet, the third and fourth ends, the fifth and sixth ends, etc. and wherein the subsequent row of Senha knots is formed on different separate pairs of warp ends consisting of the second and third ends measured from the same edge of said warp sheet, the fourth and fifth ends, the sixth and seventh ends, etc. and repeating these steps in alternation.

15. A process for securing a tufted pile to a woven fabric by means of Ghiordes knots which comprises maintaining a warp sheet of a plurality of parallel warp ends, separating the warp ends into a plurality of adjacent separate pairs, displacing each of said pairs from their normal position laterally in the plane of said sheet a distance approximating the warp end spacing, passing the leading tuft of a pile yarn through said warp sheet, one each to one side of each displaced pair of warp ends, securing each of these leading tufts, severing a short length of each pile yarn forming a pile yarn filament having a trailing tuft, returning the displaced warp end pairs to their normal position, subsequently displacing said pairs of warp ends therefrom laterally in the plane of said sheet in the opposite direction from the prior displacement a distance approximating the warp end spacing, passing the trailing tuft of each of said pile filaments through the warp sheet on the opposite side of each of said pairs, securing each of said trailing tufts at the same point as its respective leading tuft, returning the displaced warp end pairs to their normal positions and forming a Ghiordes knot from each pile filament by returning the secured leading and trailing tufts thereof through said warp sheet between the individual warp ends of each separate pair to each side of which the leading and trailing tufts respectively were previously passed.

16. A process for securing the tufted pile to a woven fabric by means of Senha knots which comprises maintaining a warp sheet of a plurality of parallel warp ends, displacing the warp ends from their normal position in one direction laterally in the plane of said sheet a distance approximating the warp end spacing, passing the leading tuft of a pile yarn through the warp sheet between each separate displaced pair of warp ends, severing a short length of each pile yarn forming a pile yarn filament having a trailing tuft, displacing each trailing tuft in a direction opposite from that of the warp ends a distance approximating the warp end spacing, passing each trailing tuft through said warp sheet to one side of the pair between which its connected leading tuft extends, securing the thus passed trailing tufts at a separate point adjacent the point at which said leading tuft is secured and forming a Senha knot from each of said pile filaments by returning the displaced warp sheet to its normal position, returning each of the secured leading tufts through said warp sheet on the opposite side of each of said pairs of warp ends and returning each of the secured trailing tufts through said warp sheet between the individual ends of each of said separate pairs.

17. A process for securing a tufted pile to a woven fabric by means of Ghiordes knots which comprises maintaining a warp sheet of a plurality of parallel warp ends, maintaining a supply of pile yarn on one side of said warp sheet, establishing the leading tuft of a pile yarn and a tuft securing point on opposite sides of said sheet and on an axis passing between each separate pair of warp ends, displacing each leading tuft and its corresponding securing point from their normal positions on said axis laterally a distance approximating the warp end spacing, passing said leading tuft through said warp sheet on one side of said pair of warp ends to said securing point, securing the thus passed leading tuft, severing a short length of pile yarn forming a new leading tuft and a pile yarn filament having a trailing tuft, returning the displaced securing point and the trailing tuft to their original position, displacing the trailing tuft and the securing point on said axis laterally in the opposite direction a distance approximating the warp end spacing, passing said trailing tuft through said warp sheet on the other side of said pair of warp ends to said securing point, securing the thus passed trailing tuft with the leading tuft, returning the securing point and the new leading tuft to their normal positions and forming a Ghiordes knot from each pile filament by returning the securing point holding the leading and trailing tufts of said pile filament through said warp sheet between the individual warp ends of the pair to each side of which the leading and trailing tufts respectively were passed.

18. A process for securing the tufted pile to a woven fabric by means of Senha knots which comprises maintaining a warp sheet of a plurality of parallel warp ends, maintaining a source of supply of pile yarn on one side of said sheet, establishing a tuft securing point on the opposite side of said sheet on an axis passing between each adjacent different pair of warp ends, establishing a leading tuft of a pile yarn in alignment with every other securing point, displacing said securing points from their normal positions laterally with respect to said warp sheet a distance approximating the warp end spacing, displacing said leading tufts in the same direction an equal distance from their normal positions, passing each leading tuft through said warp sheet to the securing point aligned therewith, severing a short length of pile yarn from each pile yarn forming a pile filament having a trailing tuft and leaving a new leading tuft, returning the displaced trailing tuft to its normal position and into alignment with another securing point adjacent the one holding the leading tuft, passing the trailing tuft through the warp sheet to said adjacent securing point and forming a Senha knot from each of said pile filaments by returning the securing points to their normal positions, passing each leading tuft through the warp sheet on the opposite side of said pair of warp ends and returning each trailing tuft through said warp sheet between the individual ends of said pair.

19. A process for securing a plurality of tufts knotted to a pair of warp ends to form products referred to as "caterpillars" which comprises maintaining a warp sheet consisting of a plurality of parallel warp ends, dividing said warp ends into a plurality of separate pairs, passing the leading tuft of a pile filament through said warp sheet, one each on one side of each of said pairs, securing this leading tuft on the opposite side of said sheet, passing the trailing tuft through said warp sheet on the other side of said pair, securing this trailing tuft with its corresponding leading tuft, forming a plurality of Ghiordes knots by returning the thus secured tufts through the warp sheet between the individual warp ends of each of said pairs, beating the knots thus formed on each of said pair up against preceding knots on the same pairs and removing a plurality of caterpillars consisting of a pair of warp ends with a plurality of pile yarn tufts secured thereto by means of Ghiordes knots.

20. An apparatus for producting piled fabrics which comprises a frame supporting a warp sheet, a plurality of pile filament tuft engaging means movable through said warp sheet, a plurality of pile filament inserting means adapted to insert the leading and trailing tufts of a pile filament through said warp sheet into engagement with said engaging means, pile yarn severing means integrally attached to said inserting means and adapted to sever said filament from said yarn after said leading tuft has been passed and before said trailing tuft is passed through said warp sheet and separate means for moving said engaging means and said yarn inserting means separately through said warp sheet.

21. An apparatus for producing fabrics which comprises a frame provided with a loom beam, a cloth roll and a warp sheet supported therebetween, a plurality of pile filament tuft engaging means reciprocable through said warp sheet, a plurality of compound pile yarn feeding needles reciprocable through said warp sheet and engageable with said engaging means, means for reciprocating said yarn feeding needles through said warp sheet to pass pile yarn therethrough into said engaging means, means for supporting a source of a pile yarn adjacent the inlet openings of said pile yarn feeding needles, means associated with said needles for severing pile yarn filaments from said pile yarn therein and means for reciprocating said engaging means through said warp sheet.

22. An apparatus for producing fabrics which comprises a frame supporting a plurality of parallel warp ends as a warp sheet, a plurality of pile yarn engaging means movable through said warp sheet, a plurality of compound pile yarn feeding needles supported on one side of said warp sheet and comprising a primary needle movable within and with respect to a secondary and a tertiary needle, said secondary needle being coaxially aligned with and integrally attached to said tertiary needle, said tertiary needle being movable through said warp sheet and engageable with at least one of said plurality of pile filament tuft engaging means, pile yarn severing means established between said secondary and tertiary needles, means for supporting a source of pile yarn adjacent the inlet opening of each of said primary needles, means for moving said yarn feeding needles and means for moving said plurality of pile yarn engaging means.

23. An apparatus according to claim 22 in combination with means for engaging and shifting said warp ends laterally within the warp sheet so that said tertiary needle is, at one extreme of lateral warp ends shift, movable through said warp sheet on one side of a given pair of warp ends and subsequently movable through said warp sheet on the other side of said pair of warp ends at the other extreme of warp ends shift.

24. An apparatus according to claim 22 in combination with means for shifting said plurality of compound pile yarn feeding needles laterally with respect to said warp sheet.

25. An apparatus according to claim 22 wherein said primary needle is provided with longitudinal slots spaced around the periphery of said needle and extending from the outlet opening thereof providing therebetween gripping fingers applying a frictional force to pile yarn contained therein.

26. An apparatus according to claim 22 wherein said compound yarn feeding needles and said gripping means are shiftable laterally with respect to said warp sheet.

27. An apparatus for forming a piled fabric which comprises a plurality of pile yarn engaging means, one for each pair of the plurality of warp ends in a warp sheet, each of said engaging means being supported on one side and reciprocable through said warp sheet to the opposite side thereof between a pair of warp ends while in their normal position, a spreader for engaging said warp sheet and segregating said warp ends therein into a plurality of pairs thereof, each pair comprising two warp ends passing on opposite sides of a pile yarn engaging means when extended through said warp sheet, a plurality of compound pile yarn feeding needles supported on said one side of said warp sheet and each reciprocable through to said other side of said warp sheet on an axis which coincides with an aperture in one of said engaging means, said compound pile yarn feeding consisting of a hollow secondary and tertiary needle integrally attached coaxially and a hollow primary needle reciprocable within said secondary and tertiary needles, pile yarn severing means established between said secondary and tertiary needles, means for introducing pile yarn into the inlet opening of each of the primary needles of said plurality of compound yarn feeding needles, means for reciprocating said primary needles within said secondary and tertiary needles, means for reciprocating said secondary and tertiary needles whereby each of said tertiary needles pass through said warp sheet and open said aperture of one of said engaging means, means for reciprocating said engaging means through said warp sheet between pairs of warp ends and means for laterally shifting said spreader to displace each of said pairs of warp ends first to one side and subsequently to the other side of their said normal position and of the axis along which each compound pile yarn feeding needle reciprocates.

28. The apparatus according to claim 27 in combination with a loom beam from which said warp ends unwind, a cloth roll for accumulating finished fabric, a frame supporting said cloth roll and loom beam, a plurality of heddles, a shuttle race, shuttle boxes and shuttle, an oscillating lay, means for actuating said heddles to form a shed in said warp sheet, means for throwing said shuttle through said shed to carry a weft yarn therethrough, and means for actuating said lay to beat a row of knots formed by operation of said yarn feeding needles, said spreader and said engaging means together with said weft yarn up against the fell of the finished fabric on said cloth roll.

29. An apparatus according to claim 27 in combination with means for laterally shifting said compound pile yarn feeding needles, said tuft engaging means and said warp sheet spreader laterally with respect to said warp sheet a distance substantially equal to the warp end spacing during the formation of one row of knots and means for subsequently returning said needles, engaging means and spreader to their former positions during the formation of the subsequent row of knots and means for successively repeating the lateral shift between the two positions to form a fabric having a pile consisting of staggered knots.

30. An apparatus for producing fabrics which comprises a frame provided with a loom beam, a cloth roll and a warp sheet supported therebetween, a plurality of pile filament tuft engaging means adapted to be moved through said warp sheet between adjacent warp ends therein, a plurality of compound pile yarn feeding needles each having an inner and an outer hollow needle in coaxial relationship, said needles being adapted to be moved through said warp sheet between adjacent warp ends therein and into engagement with said tuft engaging means, driving means connected to said needles adapted to move them through said warp sheet in a predetermined sequence to pass pile yarn through said sheet into said engaging means, means for supporting a source of pile yarn adjacent the inlet opening of each of said inner needles, yarn severing means associated with said outer needle and adapted to sever the pile yarn therein when said inner needle is partially withdrawn therefrom and driving means connected to said tuft engaging means adapted to move them through said warp sheet in a predetermined sequence in relation to the motion of said compound pile yarn feeding needles.

31. An apparatus according to claim 30 wherein one tuft engaging means is provided for every separate pair of warp ends in said warp sheet and is adapted to pass through said warp sheet between the individual warp ends of each such separate pair.

32. An apparatus according to claim 30 wherein a tuft engaging means is provided for every warp end in said warp sheet and is adapted to pass through said warp sheet immediately adjacent each such warp end.

33. An apparatus according to claim 30 wherein said tuft engaging means is provided with a lifter arm attached thereto and adapted to extend said tuft engaging means through said warp sheet, said arm being rotatable and adapted to bring said tuft engaging means into alignment with an axis passing through said warp sheet between the pair of warp ends adjacent to the pair between which said arm is passed.

34. An apparatus according to claim 30 wherein said tuft engaging means comprises a lifter arm adapted to be extended through said warp sheet, said arm being provided with a tuft-receiving aperture, a spring-loaded bevelled closure for said aperture adapted to engage and be opened by contact with the bevelled outlet opening of said outer needle, said closure further being adapted to close under the influence of said spring upon withdrawal from said aperture of said outer needle and apply a compressive force to and engage the pile yarn tuft inserted thereby.

35. An apparatus according to claim 34 in combination with a lifter stop supported on the same side of said warp sheet as said yarn feeding needles, said stop being positioned adjacent the extreme in the tuft-engaging means path and adapted to contact said engaging means at said extreme and displace said spring loaded closure and open said tuft-engaging aperture to permit disengagement therefrom of the pile filament tufts engaged therein.

36. In apparatus for weaving fabrics, an apparatus for receiving and engaging tufts of pile yarn passed through the warp sheet and for returning the engaged tufts through said sheet to form a pile knot which comprises a lifter arm adapted to be extended through said warp sheet, said arm being provided with a normally closed tuft-receiving aperture therein, a spring-loaded closure for said aperture, said closure having a closure aperture alignable with said tuft receiving aperture in said arm and adapted to be displaced into alignment with said tuft-receiving aperture against a spring loading upon contact of a bevelled surface adjacent said closure aperture with the bevelled surface of a pile yarn injecting means passed through said warp sheet into engagement with said bevelled closure aperture, said spring acting to grip a pile yarn upon removal of said injecting means, and means for passing said apparatus for receiving and engaging tufts of pile yarn back and forth through said warp sheet in a predetermined sequence.

37. In an apparatus for weaving piled fabrics, an apparatus for the formation of pile filaments and for injecting said pile filaments through a warp sheet around at least one warp end therein which comprises at least one compound pile yarn feeding needle movable through a warp sheet, said compound needle comprising a hollow secondary needle, a hollow tertiary needle integrally attached to and coaxially aligned with said secondary needle, a hollow primary needle movable within and coaxially aligned with said secondary and tertiary needles, motive means adapted to move said secondary and tertiary needles whereby the outlet opening of said tertiary needle moves between a point on one side of said warp sheet to a point on the other side, motive means adapted to move said primary needle within said secondary and tertiary needles so that the outlet opening of said primary needle moves from coincidence with the outlet opening of said tertiary needle to a point within said secondary needle and a pile yarn severing means disposed between the adjacent ends of said secondary and said tertiary needles and adapted to sever the pile yarn passing therethrough when the outlet opening of said primary needle is moved into said secondary needle leaving a pile yarn filament extending from a point within said secondary needle through said tertiary needle.

38. An apparatus according to claim 37 wherein said pile yarn severing means comprises a transversely movable shear plate disposed transverse to and between the adjacent ends of said secondary and tertiary needles, said plate being provided with a bevelled aperture through which pile yarn is passed from said secondary needle into said tertiary needle and means for moving said shear plate transversely relative to said needles to move said bevelled aperture completely out of and then back into alignment with the axis of said secondary and tertiary needles to sever a pile filament from the pile yarn passing therethrough.

39. An apparatus for the insertion of pile filaments through the warp sheet in a loom for the production of woven fabrics having a knotted pile which comprises a plurality of parallel compound pile yarn feeding needles mounted on one side of a warp sheet and movable on axes which pass through said sheet, said compound feeding needles each consisting of a tubular secondary needle aligned with and attached at one end to a tubular tertiary needle, said tertiary needle having an outlet opening for pile yarn which is normally adjacent said warp sheet and movable therethrough, a tubular primary needle movable coaxially within said secondary and tertiary needles, means attached to said primary needles to move them within said secondary and tertiary needles so that the outlet opening of said primary needle is movable from a point within said secondary needle through said tertiary needle into substantial coincidence with the outlet opening thereof and means attached to said secondary and tertiary needles to move them through said warp sheet.

PARKER H. STORTZ.

References Cited in the file of this patent

UNITED STATES PATENTS

| Number | Name | Date |
|---|---|---|
| 754,883 | Morton | Mar. 15, 1904 |
| 1,164,117 | Renard | Dec. 14, 1915 |
| 1,193,229 | Boyer | Aug. 1, 1916 |
| 1,198,722 | Grosvenor | Sept. 19, 1916 |
| 1,835,211 | Eibuschitz et al. | Dec. 8, 1931 |

FOREIGN PATENTS

| Number | Country | Date |
|---|---|---|
| 311,232 | Great Britain | Apr. 10, 1930 |